United States Patent [19]

Naveen

[11] Patent Number: 5,623,313
[45] Date of Patent: Apr. 22, 1997

[54] FRACTIONAL PIXEL MOTION ESTIMATION OF VIDEO SIGNALS

[75] Inventor: T. Naveen, Beaverton, Oreg.

[73] Assignee: Tektronix, Inc., Wilsonville, Oreg.

[21] Appl. No.: 532,325

[22] Filed: Sep. 22, 1995

[51] Int. Cl.$^6$ ................................................ H04N 7/32
[52] U.S. Cl. ............................................ 348/416; 348/699
[58] Field of Search ............................. 348/384, 390,
348/400–402, 407, 409–413, 415, 416,
420, 699; 382/232, 236, 238; H04N 7/130,
7/137

[56] References Cited

U.S. PATENT DOCUMENTS

| | | | |
|---|---|---|---|
| 4,245,248 | 1/1981 | Netravali et al. . | |
| 4,383,272 | 5/1983 | Netravali et al. . | |
| 4,937,666 | 6/1990 | Yang | 348/413 |
| 5,134,477 | 7/1992 | Knauer et al. | 348/416 |
| 5,151,784 | 9/1992 | Lavagetto et al. . | |
| 5,200,820 | 4/1993 | Gharavi . | |
| 5,355,168 | 10/1994 | Sugiyama | 348/407 |
| 5,408,269 | 4/1995 | Tsukagoshi | 348/416 |
| 5,488,419 | 1/1996 | Hui et al. | 348/402 |
| 5,489,949 | 2/1996 | Jeong et al. | 348/699 |
| 5,493,344 | 2/1996 | Yu | 348/699 |

OTHER PUBLICATIONS

"Digital Pictures: Representation & Compression" by A.N. Netravali & B.G. Haskell, Plenum Press: NY 1988, pp. 334–340.
"Image Analysis and Computer Vision" Chapter 9, pp. 404–407, (no date provided).
"Interframe Coding" Sec. 11.7, pp. 521–529, (no date provided).
"A Codec for HDTV" by Netravali et al, Jun. 5, 1992, 1992 IEEE, pp. 325–340.

*Primary Examiner*—Tommy P. Chin
*Assistant Examiner*—Richard Lee
*Attorney, Agent, or Firm*—Francis I. Gray

[57] ABSTRACT

Fractional pixel motion estimation of video signals is performed by comparing a block of pixels from a current image of the video signal with a plurality of displaced blocks within a search window from a previous/future reference image of the video signal via a distortion function. The displaced block from the reference image that produces the minimum value for the distortion function provides a center pixel. A general surface is fitted around this center pixel so that it equals the distortion function at each integer pixel location surrounding the center pixel. The distortion function for the fitted surface is estimated for fractional pixel locations, and the motion vector corresponding to the minimum value for the fractional distortion function is selected for transmission as part of the compressed video.

1 Claim, 2 Drawing Sheets

FRACTIONAL PIXEL MOTION ESTIMATION OF VIDEO SIGNALS

BACKGROUND OF THE INVENTION

The present invention relates to compression of motion video signals, and more particularly to fractional pixel motion estimation of video signals for simplifying the determination of a best motion vector for each pixel of the video signals during video compression.

Video and many medical images are received as sequences of two-dimensional image frames or fields. To transmit such images as digital signals some form of compression is required. Three basic types of redundancy are exploited in a video compression process: temporal redundancy, spatial redundancy and amplitude redundancy. Interframe coding techniques make use of the redundancy between successive frames (temporal redundancy). In these techniques the information defining elements of a picture, i.e., pixels, are estimated by interpolation or prediction using information from related locations in preceding and/or succeeding versions of the picture, as exemplified in U.S. Pat. No. 4,383,272 issued May 10, 1983 to Netravali et al entitled "Video Signal Interpolation Using Motion Estimation." A typical compression encoder is shown in FIG. 1 where a video signal is input to a preprocessor and then into a motion estimator. The motion estimator delays the video signal, to compensate for the processing delays for the motion vector generation process, before providing the video signal to an encoder loop where compression is performed. The compression is performed using a motion vector generated by the motion estimator, which is multiplexed with the compressed video signal at the output of the encoder for transmission.

The interpolation between frames in the encoder is performed by first estimating the motion trajectory, i.e., motion vector or displacement vector, of each pixel. If an estimate of such displacement is available, then more efficient prediction may be performed in the encoder by relating to elements in a previous frame that are appropriately spatially displaced. These displacement vectors are used to project each pixel along its trajectory, resulting in the motion compensated prediction or interpolation. Once the motion vectors are determined, then the differences between consecutive motion compensated frames that exceed a predetermined threshold are determined by the encoder loop as the compressed video signal.

Most motion estimation in interframe coding assumes (i) objects move in translation, i.e., zoom and rotation are not considered, (ii) illumination is spatially and temporally uniform, and (iii) occlusion of one object by another and uncovered background are not considered. In practice motion vectors are estimated for blocks of pixels so that the displacements are piecewise constant. Block matching is used to estimate the motion vector associated with each block of pixels in a current coding frame or field, assuming that the object displacement is constant within a small two-dimensional block of pixels. In these methods the motion vector for each block in the current frame or field is estimated by searching through a larger search window in a previous frame/field and/or succeeding frame/field for a best match using correlation or matching techniques. The motion estimator compares a block of pixels in the current frame with a block in the previous or future frame by computing a distortion function, such as shown in FIG. 2. Each block in the current frame is compared to displaced blocks at different locations in the previous or future frame within a search window, and the displacement vector that gives the minimum value of the distortion function is selected as being the best representation of the motion for that block.

Using the notation (row,column) to present a position in a picture, for a block of M×N pixels at (m,n) the distortion function $D_{(m,n)}(i,j)$ for a displacement of (i,j) may be given as $$D_{(m,n)}(i,j) + e, dus \Delta \Sigma^M_{k=1} \Sigma_{l=1}^N f(v(m+k,n+l) - u(m+k-i, n+l-j))$$

where $u(,)$ is the previous or future image, $v(,)$ is the current image, and $f(x)$ is a given positive and increasing function of x. In general the candidate displacement vector (i,j) is restricted to a preselected $[-p_1,p_2] \times [-q_1,q_2]$ region, or search window. Some useful choices for $f(x)$ are $|x|$ and $x^2$. Minimizing $D_{(m,n)}(,)$ for various (i,j)s for a given (m,n) gives the displacement vector for the block at (m,n).

If i and j are both integers, minimization of the distortion function gives the motion vectors to an integer accuracy, or a full pixel. Fractional pixel accuracy motion vectors usually give better motion compensated prediction than the full pixel motion vectors. Fractional pixel accuracy motion vectors may be obtained by computing $u(,)$ at fractional pixel grid locations through spatial interpolation. However obtaining the fractional pixel accuracy motion vectors is computationally very expensive. Netravali et al, as described in the article entitled "A Codec for HDTV", *IEEE Trans. Consumer Electronics*, vol. 38, pp. 325–340, Aug. 1992, use a simple scheme to approximate the half pixel motion vectors independently horizontally and vertically using the distortion function computed at integer pixel locations. Let $D_{(m,n)}(i,j)$ be minimum for $(i,j)=(i_0,j_0)$ (integer pixel accuracy). A parabola is fit to the three points around the minimum, and the resulting equation is solved to find the position of the minimum of the curve. The process of computing the fractional pixel accuracy motion vector $(i'_0, j'_0)$ for a block at (m,n) simplifies to solving $i_0-½; (3D_{(m,n)}(i_0+1,j_0)-2D_{(m,n)}(i_0,j_0)-D_{(m,n)}(i_0-1,j_0))<0$ $i'_0=i_0+½; (3D_{(m,n)}(i_0-1, j_0)-2D_{(m,n)}(i_0,j_0)-D_{(m,n)}(i_0+1,j_0))<0$ $i_0;$ otherwise and $j_0-½; (3D_{(m,n)}(i_0, j_0+1)-2D_{(m,n)}(i_0,j_0)-D_{m,n}(i_0,j_0-1))-0$ $j'_0=j_0+½; (3D_{(m,n)}(i_0,j_0-1)-2D_{(m,n)}(i_0,j_0+1))<0$ $j_0;$ otherwise This fractional pixel motion estimation is performed by a motion vector refinement generator as shown in FIG. 2. FIG. 3 shows a block of pixels in a frame about the minimum integer pixel, and the fractional pixel locations that surround that pixel for which the distortion function is determined by interpolation from the distortion function for the surrounding pixels.

What is desired is an improved fractional pixel motion estimation of video signals that provides greater accuracy.

SUMMARY OF THE INVENTION

Accordingly the present invention provides fractional pixel motion estimation of video signals using a general surface fit to a distortion function. A general surface is fit to a distortion function at a plurality of pixels in two dimensions about a pixel $(i_o, j_o)$ having a minimum integer distortion function. The distortion function is estimated or interpolated at fractional pixel locations surrounding the minimum distortion pixel as a function of the constants that define the general surface and the values of the distortion function for the surrounding pixels. From the fractional pixel distortion function values and the minimum integer pixel distortion function value the minimum value is selected, and the corresponding fractional pixel location defines the motion vector for predicting the location of the pixels of the block in the previous/future frame/field as part of the video compression process.

The objects, advantages and novel features of the present invention are apparent from the following detailed description when read in conjunction with the appended claims and attached drawing.

DESCRIPTION OF THE PREFERRED EMBODIMENT

Figure 1:
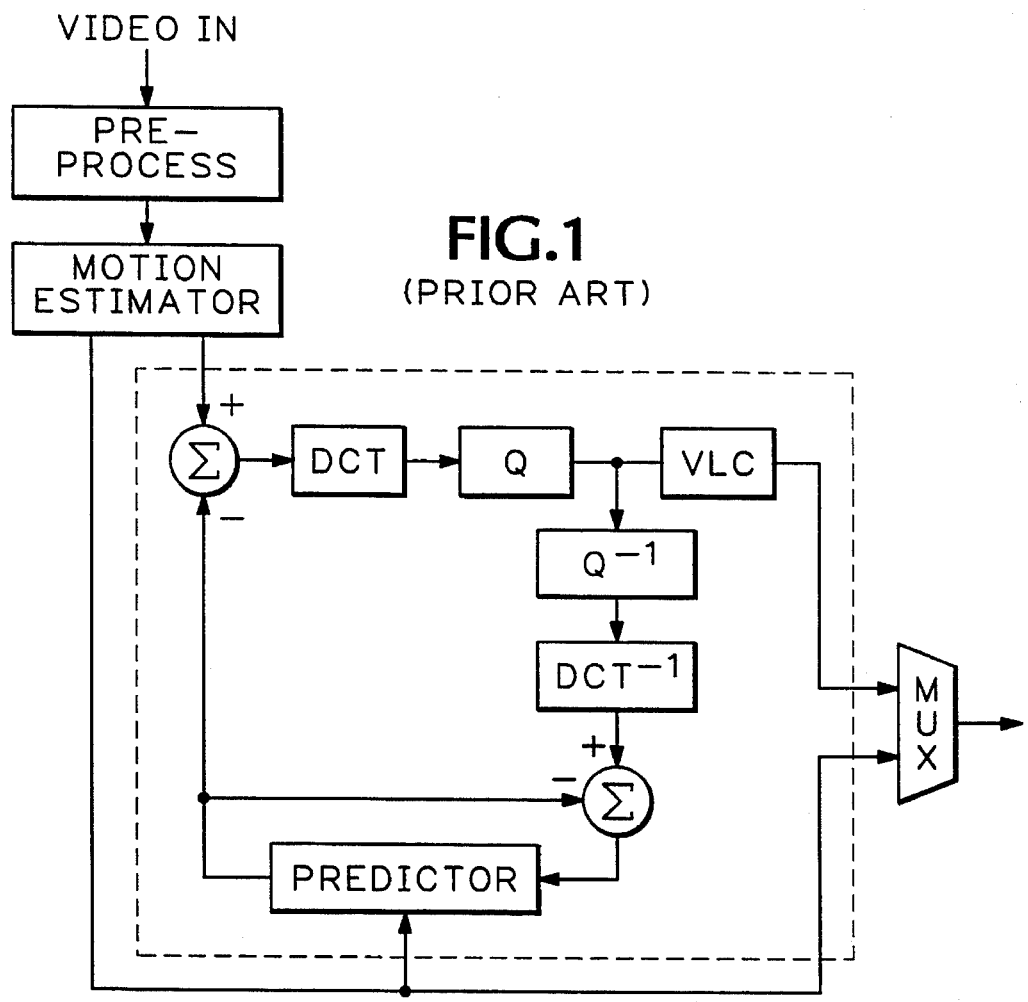
FIG. 1 is a block diagrammatic view of a video compression encoder using motion estimation according to the prior art which may use the fractional pixel motion estimation according to the present invention.
Figure 2:
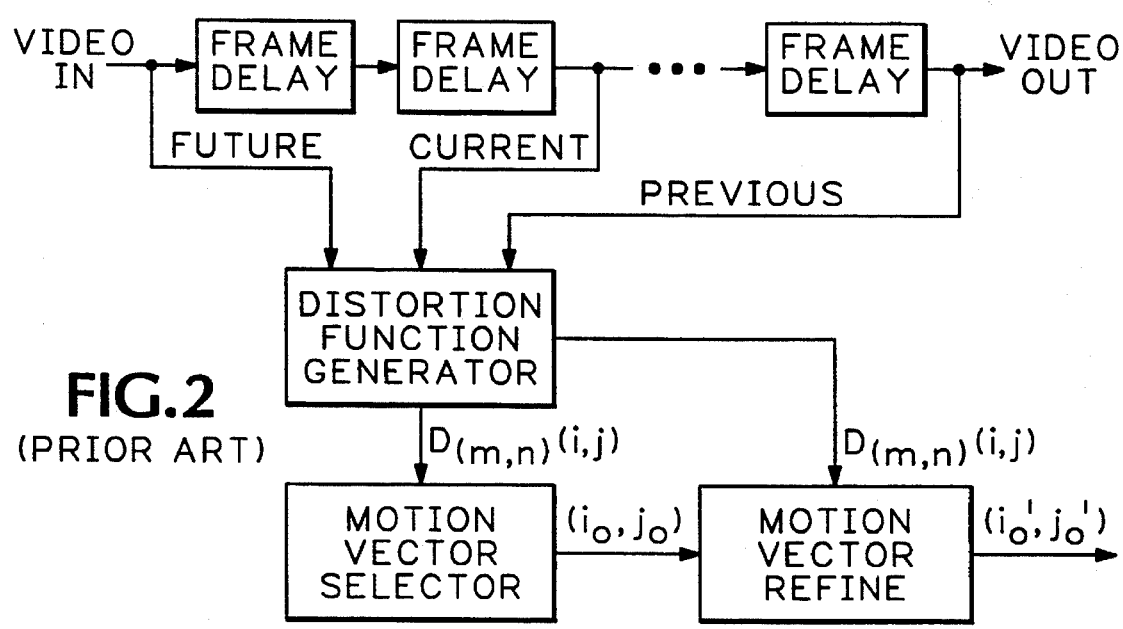
FIG. 2 is a block diagrammatic view of a motion estimator according to the prior art which is suitable for performing fractional pixel motion estimation according to the present invention.
Figure 3:
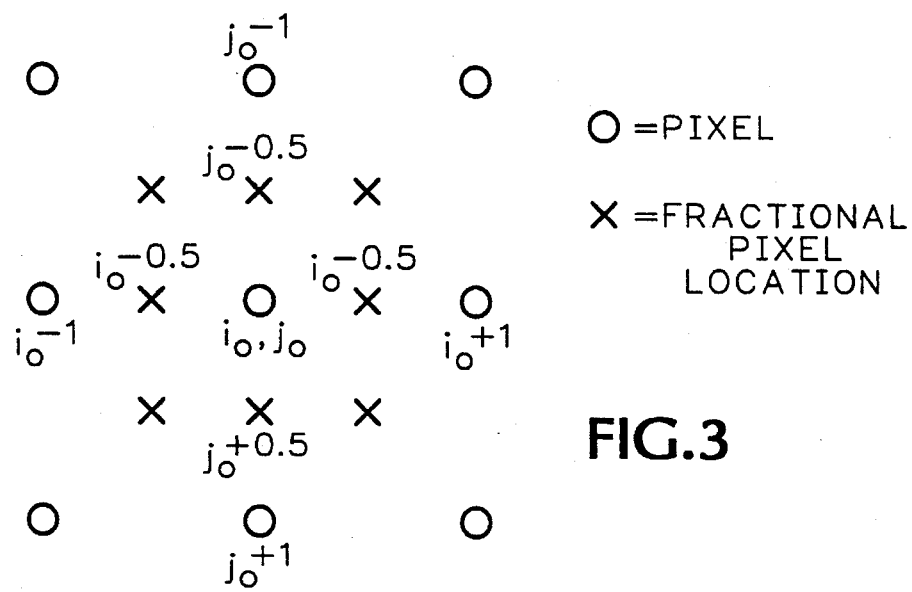
FIG. 3 is a plan view of a portion of a frame representing a block of pixels that are processed according to the present invention.

As opposed to a separate parabola for each of two dimensions, as discussed above, a general surface is fitted to a distortion function $D_{(m,n)}$ to compute an approximate fractional pixel motion vector. If $D_{(m,n)}(i,j)$ has a minimum for $(i,j)=(i_0,j_0)$, then a fitted surface $Ds_{(m,n)}(i,j)$ to $D_{(m,n)}(i,j)$ around that point is given by $$Ds_{(m,n)}(i,j)=c_0(i-i_0)^2(j-j_0)^2+c_1(i-i_0)^2(j-j_0)+c_2(i-i_0)(j-j_0)^2+c_3(i-i_0)^2+c_4(j-j_0)^2+c_5(i-i_0)(j-j_0)+c_6(i-i_0)+c_7(j-j_0)+c_8$$

where $c_0$ through $c_8$ are constants defining the surface $Ds_{(m,n)}(i,j)$ and $Ds_{(m,n)}(i,j)=D_{(m,n)}(i,j)$ at integer pixel locations about $(i_0, j_0)$ $$Ds_{(m,n)}(i,j)=D_{(m,n)}(i,j), (i,j)\epsilon[i_0-1,i_0+1]\times[j_0-1,j_0+1].$$

Then $c_0$ through $c_8$ are found by $$\begin{aligned}
c_0 = {}& 1/4[D_{(m,n)}(i_0+1,j_0+1)+D_{(m,n)}(i_0-1,j_0+1)+ \\
& D_{(m,n)}(i_0+1,j_0-1)+D_{(m,n)}(i_0-1,j_0-1)- \\
& 2[D_{(m,n)}(i_0,j_0-1)+D_{(m,n)}(i_0,j_0+1)+ \\
& D_{(m,n)}(i_0-1,j_0)+D_{(m,n)}(i_0+1,j_0)]+4D_{(m,n)}(i_0,j_0)]
\end{aligned}$$

-continued $$\begin{aligned}
c_1 = {}& 1/4[-2D_{(m,n)}(i_0,j_0+1)+2D_{(m,n)}(i_0,j_0-1)+ \\
& D_{(m,n)}(i_0+1,j_0+1)+D_{(m,n)}(i_0-1,j_0+1)- \\
& D_{(m,n)}(i_0+1,j_0-1)-D_{(m,n)}(i_0-1,j_0-1)]
\end{aligned}$$

$$\begin{aligned}
c_2 = {}& 1/4[2D_{(m,n)}(i_0-1,j_0)-2D_{(m,n)}(i_0+1,j_0)+ \\
& D_{(m,n)}(i_0+1,j_0+1)+D_{(m,n)}(i_0+1,j_0-1)- \\
& D_{(m,n)}(i_0-1,j_0+1)-D_{(m,n)}(i_0-1,j_0-1)]
\end{aligned}$$

$$\begin{aligned}
c_3 = {}& 1/2[D_{(m,n)}(i_0-1,j_0)+D_{(m,n)}(i_0+1,j_0)- \\
& 2D_{(m,n)}(i_0,j_0)]
\end{aligned}$$

$$\begin{aligned}
c_4 = {}& 1/2[D_{(m,n)}(i_0,j_0-1)+D_{(m,n)}(i_0,j_0+1)- \\
& 2D_{(m,n)}(i_0,j_0)]
\end{aligned}$$

$$\begin{aligned}
c_5 = {}& 1/4[D_{(m,n)}(i_0+1,j_0+1)+D_{(m,n)}(i_0-1,j_0-1)- \\
& D_{(m,n)}(i_0-1,j_0+1)-D_{(m,n)}(i_0+1,j_0-1)]
\end{aligned}$$

$$c_6 = 1/2[D_{(m,n)}(i_0+1,j_0)-D_{(m,n)}(i_0-1,j_0)]$$

$$c_7 = 1/2[D_{(m,n)}(i_0,j_0+1)-D_{(m,n)}(i_0,j_0-1)]$$

$$c_8 = D_{(m,n)}(i_0,j_0)$$

The above equations define the fitted surface $Ds_{(m,n)}$. One way to find the fractional pixel accurate motion vector is to find the gradient of the surface representation of Ds and find the position that gives minimum D. This fractional pixel accurate motion vector may then be quantized to a required precision.

If the accuracy needed for the motion vector is known, another method may be used to estimate the fractional pixel accurate motion vector. Using the equations describing Ds, one can estimate the distortion function value at fractional pixel locations on a grid with desired accuracy spacing. For example if motion vectors are needed with half-pixel accuracy, the following procedure may be used. Ds computed at half-pixel positions around $(i_0, j_0)$ simplifies to:

$$\begin{aligned}
Ds_{(m,n)}(i_0-0.5,j_0) = {}& 0.375D_{(m,n)}(i_0-1,j_0)- \\
& 0.125D_{(m,n)}(i_0+1,j_0)+0.75D_{(m,n)}(i_0,j_0)
\end{aligned}$$

$$\begin{aligned}
Ds_{(m,n)}(i_0+0.5,j_0) = {}& 0.375D_{(m,n)}(i_0+1,j_0)- \\
& 0.125D_{(m,n)}(i_0-1,j_0)+0.75D_{(m,n)}(i_0,j_0)
\end{aligned}$$

$$\begin{aligned}
Ds_{(m,n)}(i_0,j_0-0.5) = {}& 0.375D_{(m,n)}(i_0,j_0-1)- \\
& 0.125D_{(m,n)}(i_0,j_0+1)+0.75D_{(m,n)}(i_0,j_0)
\end{aligned}$$

$$\begin{aligned}
Ds_{(m,n)}(i_0,j_0+0.5) = {}& 0.375D_{(m,n)}(i_0,j_0+1)- \\
& 0.125D_{(m,n)}(i_0,j_0-1)+0.75D_{(m,n)}(i_0,j_0)
\end{aligned}$$

$$\begin{aligned}
Ds_{(m,n)}(i_0-0.5,j_0+0.5) = {}& 0.28125D_{(m,n)}(i_0,j_0+1)+ \\
& 0.28125D_{(m,n)}(i_0-1,j_0)+ \\
& 0.140625D_{(m,n)}(i_0-1,j_0+1)- \\
& 0.046875D_{(m,n)}(i_0-1,j_0-1)- \\
& 0.09375D_{(m,n)}(i_0+1,j_0)- \\
& 0.046875D_{(m,n)}(i_0+1,j_0+1)+ \\
& 0.015625D_{(m,n)}(i_0+1,j_0-1)- \\
& 0.09375D_{(m,n)}(i_0,j_0-1)+ \\
& 0.5625D_{(m,n)}(i_0,j_0)
\end{aligned}$$

$$Ds_{(m,n)}(i_0+0.5, j_0+0.5) = 0.28125 D_{(m,n)}(i_0, j_0+1) -$$
$$0.09375 D_{(m,n)}(i_0-1, j_0) -$$
$$0.046875 D_{(m,n)}(i_0-1, j_0+1) +$$
$$0.015625 D_{(m,n)}(i_0-1, j_0-1) +$$
$$0.28125 D_{(m,n)}(i_0+1, j_0) +$$
$$0.140625 D_{(m,n)}(i_0+1, j_0+1) -$$
$$0.046875 D_{(m,n)}(i_0+1, j_0-1) -$$
$$0.09375 D_{(m,n)}(i_0, j_0-1) +$$
$$0.5625 D_{(m,n)}(i_0, j_0)$$

$$Ds_{(m,n)}(i_0-0.5, j_0-0.5) = -0.09375 D_{(m,n)}(i_0, j_0+1) +$$
$$0.28125 D_{(m,n)}(i_0-1, j_0) -$$
$$0.046875 D_{(m,n)}(i_0-1, j_0+1) +$$
$$0.140625 D_{(m,n)}(i_0-1, j_0-1) -$$
$$0.09375 D_{(m,n)}(i_0+1, j_0) +$$
$$0.015625 D_{(m,n)}(i_0+1, j_0+1) -$$
$$0.046875 D_{(m,n)}(i_0+1, j_0-1) +$$
$$0.28125 D_{(m,n)}(i_0, j_0-1) +$$
$$0.5625 D_{(m,n)}(i_0, j_0)$$

$$Ds_{(m,n)}(i_0+0.5, j_0-0.5) = -0.09375 D_{(m,n)}(i_0, j_0+1) -$$
$$0.09375 D_{(m,n)}(i_0-1, j_0) +$$
$$0.015625 D_{(m,n)}(i_0-1, j_0+1) -$$
$$0.046875 D_{(m,n)}(i_0-1, j_0-1) +$$
$$0.28125 D_{(m,n)}(i_0+1, j_0) -$$
$$0.046875 D_{(m,n)}(i_0+1, j_0+1) +$$
$$0.140625 D_{(m,n)}(i_0+1, j_0-1) +$$
$$0.28125 D_{(m,n)}(i_0, j_0-1) +$$
$$0.5625 D_{(m,n)}(i_0, j_0)$$

Once the values of Ds at half-pixel positions are found from the above equations, the best half-pixel accurate motion vector may be selected.

Figure 4:
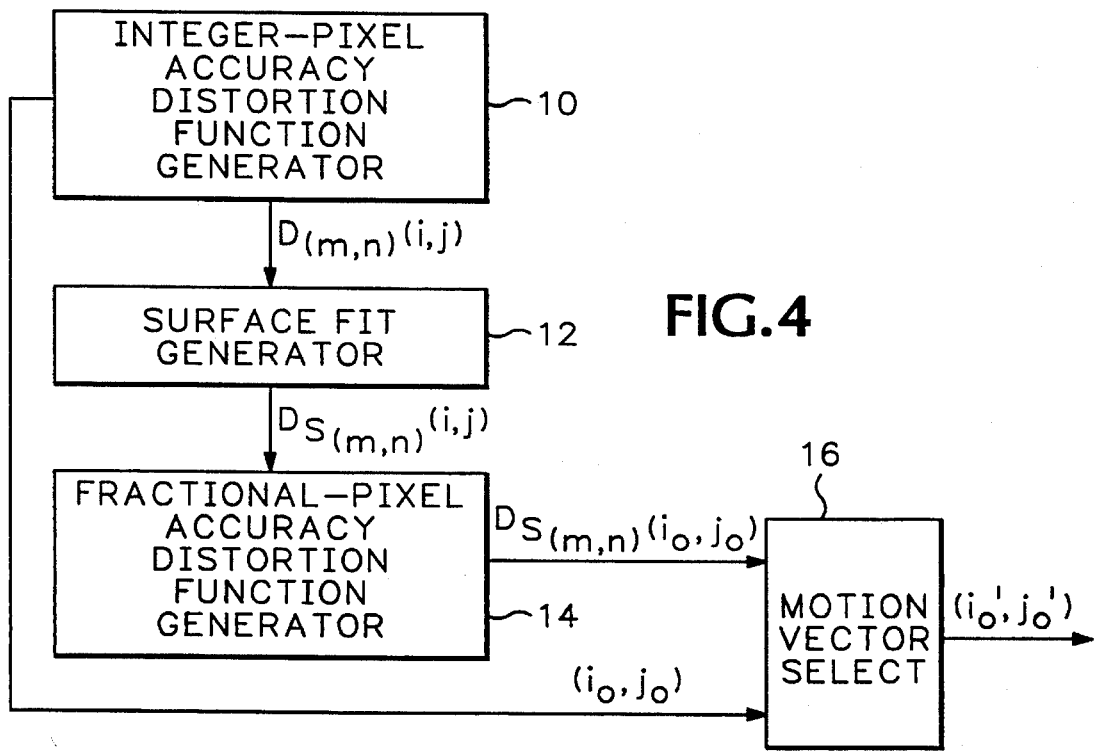
FIG. 4 is a block diagrammatic view of a motion vector refinement generator that performs the general fractional pixel motion estimation according to the present invention.

As shown in FIG. 4 the distortion function for the minimum distortion pixel $(i_0, j_0)$ and the surrounding pixels from an integer-pixel accuracy distortion generator 10 is input to a surface fit generator 12 to produce the general surface fit distortion function $Ds_{(m,n)}(i,j)$. The surface fit distortion function is then input to a fractional-pixel accuracy distortion function generator 14 to produce the distortion function for the fractional pixel locations about the minimum integer distortion pixel. The fractional pixel displacement vectors and the minimum integer distortion pixel $(i_0, j_0)$ are input to an output motion vector selector 16 to produce the refined motion vector $(i_0, j'_0)$ for use by the compression encoder and for input to the compressed video signal for transmission.

Thus the present invention provides a fractional pixel-motion estimation for video signals by fitting a general surface to a block of integer pixels about one having a minimum distortion function, and estimating the distortion function at fractional pixel locations to select the displacement vector with fractional pixel accuracy having the minimum distortion function as the motion vector for the block of the current image.

What is claimed is:

1. An improved method of fractional pixel motion estimation for a video compression signal encoder wherein a block of pixels in a current video image of an input video signal is compared with displaced blocks of pixels at different locations in a reference video image to provide a compressed video signal by generating a distortion function for each location and selecting a displacement vector that gives a minimum value of the distortion function as a motion vector for the block of pixels, the motion vector being used by the video compression signal encoder to predict the reference video image, the improvement comprising the steps of:

fitting a general surface to the distortion function so that the fitted surface equals the distortion function at integer pixel locations surrounding a center pixel of the block having the minimum value of the distortion function;

estimating the distortion function at fractional pixel locations surrounding the center pixel; and selecting, as the motion vector, the displacement vector that gives a minimum value for the fractional pixel distortion function from among the center pixel and the fractional pixel locations surrounding the center pixel, the selected motion vector being transmitted as part of the compressed video for the block of pixels.

\* \* \* \* \*